(12) United States Patent
Taga et al.

(10) Patent No.: US 6,813,114 B2
(45) Date of Patent: Nov. 2, 2004

(54) MAGNETIC RECORDING MEDIUM HAVING A DISK DRIVE AND CARTRIDGE

(75) Inventors: Kazuaki Taga, Kanagawa-ken (JP); Masanori Kurihara, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/266,584

(22) Filed: Oct. 9, 2002

(65) Prior Publication Data

US 2003/0067712 A1 Apr. 10, 2003

(30) Foreign Application Priority Data

Oct. 10, 2001 (JP) ........................................ 2001-312864

(51) Int. Cl.⁷ .............................................. G11B 5/012
(52) U.S. Cl. .................................. 360/97.01; 360/99.01
(58) Field of Search ................. 360/97.01, 99.01–99.05

(56) References Cited

U.S. PATENT DOCUMENTS

| 4,553,175 A | 11/1985 | Baumeister |
| 5,809,520 A | 9/1998 | Edwards et al. |

*Primary Examiner*—A. J. Heinz
(74) *Attorney, Agent, or Firm*—Sughrue Mion, PLLC

(57) ABSTRACT

A magnetic recording medium comprising a card-type disk drive and a magnetic disk cartridge. The disk drive has a length of 38 to 55 mm, a width of 35 to 51 mm, and a thickness of 3 to 5 mm, and comprises a drive mechanism for rotating the magnetic disk of the magnetic disk cartridge loaded in the disk drive, a magnetic head for magnetically recording or reproducing information on or from the magnetic disk, and an electric connection portion for electrically connecting the drive mechanism and the magnetic head with an electronic circuit provided in electronic equipment. The magnetic disk cartridge has a length of 25 to 36 mm, a width of 25 to 36 mm, and a thickness of 1 to 3 mm. The magnetic disk comprises a magnetic recording medium of high-recording density employing barium ferrite powder and has a recording capacity of 200 megabytes or larger.

10 Claims, 1 Drawing Sheet

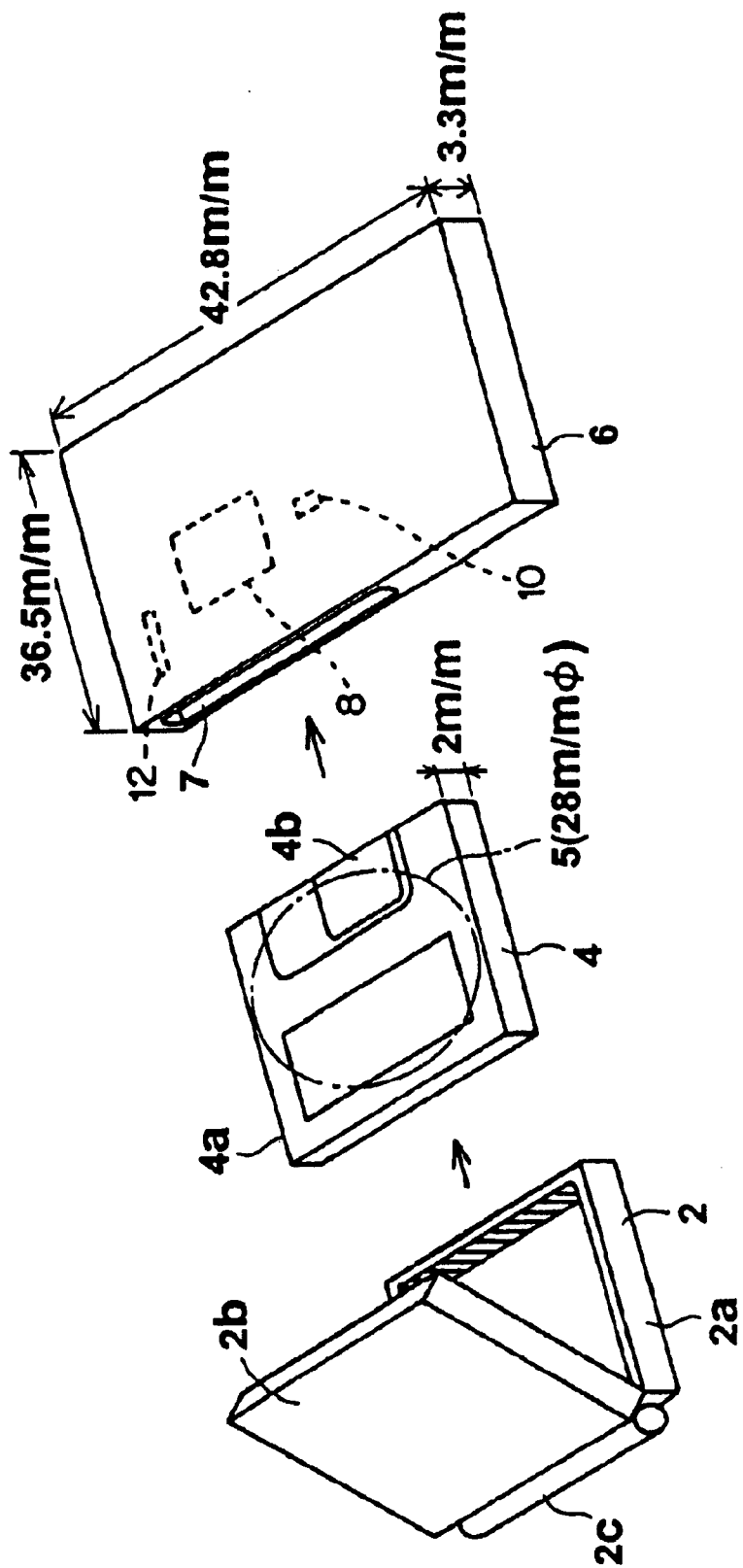

MAGNETIC RECORDING MEDIUM HAVING A DISK DRIVE AND CARTRIDGE

BACKGROUND OF THE INVENTION

1. Field of the Invention

The present invention relates generally to a magnetic recording medium that is loaded in the card slot of electronic equipment such as a digital still camera, a digital video camera, a laptop computer, etc. More particularly, the invention relates to a magnetic recording medium of a large recording capacity and small size that consists of a card-type disk drive which is loaded in the card slot of electronic equipment, and a magnetic disk cartridge which is exchangeably loaded in the disk drive.

2. Description of the Related Art

To record or reproduce information, a recording medium is removably inserted in the card slot of electronic equipment such as a digital still camera, a digital video camera, a laptop computer, etc. Such a recording medium in practical use are of a semiconductor memory type, a hard disk type, an optical disk type, a magnetic disk type (e.g., a floppy disk type), etc.

Among these recording media, semiconductor memories are most widely used because they are easy to handle and have a relatively large recording capacity. However, they are relatively expensive. Because of this, in digital cameras employing the semiconductor memory, the photographed image data is transferred to a PC and stored, the data is deleted from the memory, and the semiconductor memory is repeatedly used.

Optical disks have a large recording capacity for its size. For example, an optical disk with a size of 35 mm×41 mm×11 mm can store 256 MB of data. Optical disks with a recording capacity of 412 MB are about to be realized. However, optical disks have the disadvantage that its recording speed is slow, because their writing time is time-consuming.

Some magnetic disks such as a floppy disk have a small size of 50 mm×55 mm×2 mm. Such a small magnetic disk can be exchangeably loaded in a disk drive of a size that can be inserted into the card slot of a PC, etc. However, the recording capacity is as small as 40 MB and insufficient to record image data photographed by a camera. In addition, the size is not suitable for digital cameras.

With the spread of PCs, digital cameras have spread rapidly in recent years because of the simplicity of recording, enhancement in picture quality due to the development of imaging elements, possibility of data deletion and transmission, recording capacity size, etc. However, the method of use is restricted, because recording media are limited in cost and recording capacity, as described above. For instance, since recording media are very expensive, a single camera has only a single recording medium, which is repeatedly used. That is, when the recording medium is filled with data, the data is transferred to a PC and deleted. Because of this, there are cases where the recording medium is filled up during a trip. In such a case, the recording medium cannot be stored along with data and cannot be given to a person.

SUMMARY OF THE INVENTION

The present invention has been made in view of the above-described circumstances. Accordingly, it is the primary object of the present invention to provide a magnetic recording medium which is large in recording capacity, low in cost, and small in size so that the data photographed by a digital camera can be stored or given to a person.

To achieve this end and in accordance with the present invention, there is provided a magnetic recording medium comprising a card-type disk drive that is loaded in a card slot of electronic equipment, and a magnetic disk cartridge that is loaded in the disk drive. The magnetic disk cartridge rotatably houses a flexible magnetic disk in a housing equipped with a shutter. The disk drive has a length of 38 to 55 mm, a width of 35 to 51 mm, and a thickness of 3 to 5 mm, and comprises a drive mechanism for rotating the magnetic disk of the magnetic disk cartridge loaded in the disk drive; a magnetic head for magnetically recording or reproducing information on or from the magnetic disk; and an electric connection portion for electrically connecting the drive mechanism and the magnetic head with an electronic circuit provided in the electronic equipment. The magnetic disk cartridge has a length of 25 to 36 mm, a width of 25 to 36 mm, and a thickness of 1 to 3 mm. The magnetic disk comprises a magnetic recording medium of high-recording density employing barium ferrite powder and has a recording capacity of 200 megabytes or larger.

The card slot of the electronic equipment in which the disk drive is loaded may be a newly provided dedicated slot. For example, if a dedicated slot is disposed near an insertion slot provided for conventional magnetic recording media, users can use both the conventional magnetic recording media and the magnetic recording medium of the present invention. In this case, the existing recording media will not be wasted.

The "magnetic recording medium of high-recording density employing barium ferrite powder" is a magnetic disk containing barium ferrite powder in a magnetic layer, and employs a material capable of high recording density.

According to the magnetic recording medium of the present invention constructed as described above, the disk drive has a length of 38 to 55 mm, a width of 35 to 51 mm, and a thickness of 3 to 5 mm. Therefore, it is suitable for a PC such as a laptop, a digital camera, a video camera, etc. The magnetic disk cartridge has a length of 25 to 36 mm, a width of 25 to 36 mm, and a thickness of 1 to 3 mm and is thus small in size. However, the magnetic disk is a magnetic recording medium with a magnetic layer of high recording density containing barium ferrite powder, and has a recording capacity of 200 megabytes or larger. Therefore, the magnetic disk cartridge is suitable for use in a digital camera and easy to handle. In addition, the magnetic disk cartridge can be manufactured at a low cost, because it comprises a magnetic disk. The magnetic disk cartridge recorded can be stored as it is, or it can be given to a person.

According to the magnetic recording medium of the present invention, the size of the disk drive is one third or less of the size of the digital camera viewed from the front. The magnetic medium of about 2 mm in thickness which has a magnetic disk of about 28 mm in diameter can be loaded in the disk drive. Thus, the present invention is capable of realizing a magnetic medium which is conveniently portable and easy to use.

Further in accordance with the magnetic recording medium of the present invention, the disk of the above-described size can have a recording capacity of 500 megabytes. In such a case, the magnetic recording medium can store 500 photographs on a single disk. The price can be realized at a few hundred yen, so the practical effect is extremely great.

BRIEF DESCRIPTION OF THE DRAWINGS

The present invention will be described in further detail with reference to the accompanying drawings wherein:

FIG. 1 is a perspective view showing a magnetic recording medium constructed in accordance with a preferred embodiment of the present invention.

DESCRIPTION OF THE PREFERRED EMBODIMENT

Referring now to FIG. 1, there is shown a magnetic recording medium constructed in accordance with a preferred embodiment of the present invention. The magnetic recording medium of the preferred embodiment is employed in electronic equipment such as a PC, a portable telephone, etc. Particularly, it is inserted into the card slot of a digital camera. The magnetic recording medium comprises a magnetic disk cartridge 4 and a disk drive 6.

When recording or reproducing information using the magnetic recording medium, the magnetic disk cartridge 4 is first inserted into the disk drive 6. Then, the disk drive 6 with the magnetic disk cartridge 4 is inserted, for example, into the card slot of electronic equipment such as a digital camera, etc. Next, information is recorded on or reproduced from the magnetic disk 5 of the magnetic disk cartridge 4 through the disk drive 6 by the electronic equipment such as a digital camera, etc.

The disk drive 6 includes a drive mechanism 8 for rotating the magnetic disk 5 of the magnetic cartridge 4 loaded through a disk insertion slot 7; a magnetic head 10 for recording or reproducing information on or from the magnetic disk 5; and an electric connection portion 12 for electrically connecting the drive mechanism and the magnetic head with an electric circuit provided within the electronic equipment. When recording or reproducing information on or from the magnetic disk cartridge 4, the information is recorded or reproduced on or from the magnetic disk 5 being rotated by the drive mechanism of the disk drive 6, using the magnetic head. Information to be recorded on the magnetic disk 5 is input from the electric connection portion of the disk drive 6, while information to be reproduced from the magnetic disk 5 is output from the electric connection portion of the disk drive 6.

As illustrated in FIG. 1, the disk drive 6 has a dimension of 36.4 mm (width)×42.8 mm (height)×3.3 mm (thickness). This is for the following reasons.

Commercially available digital cameras have, for example, a width of 85 to 120 mm, a height of 54 to 76 mm, and a thickness of 24 to 30 mm. Considering the dimensions of the lens portion of a digital camera, and that an optical path is secured at the back of the lens portion to install a charge-coupled device (CCD), the disk drive 6 cannot be loaded at the back of the lens portion. If it is assumed that the lens portion of the digital camera is disposed at the center, at least the width of the disk drive 6 is preferably one third or less of the size of the digital camera viewed from the front (lens installing face). Therefore, it is preferable that the disk drive 6 have a length of 8 to 55 mm, a width of 35 to 51 mm, and a thickness of 3 to 5 mm.

Particularly, in view of the dimensions of the semiconductor memory currently used in digital cameras, the disk drive 6 has a size of 36.4 mm (width)×42.8 mm (height)×3.3 mm (thickness) so that the magnetic disk cartridge 4 can be used in the slot of the semiconductor memory.

The magnetic disk cartridge 4 includes a housing 4a, a movable shutter 4b, a magnetic disk 5, etc. The housing 4a has a hollow portion, in which the magnetic disk 5 is rotatably housed. The housing 4a is equipped with the movable shutter 4b. When the magnetic disk cartridge 4 is loaded in the disk drive 6, and information is recorded or reproduced, the shutter 4b is opened so that the magnetic disk 5 is exposed.

The diameter of the magnetic disk 5 is formed so that it is 25 to 35.5 mm (about 1 to 1.4 inches). The lower limit of the diameter is set to about 25 mm in consideration of handling performance. That is, if the diameter of a conventional magnetic disk (46 mm=about 1.8 inches) is reduced to 25 mm (about 1 inch), the magnetic disk cartridge 4 can be employed with the same sense as a coin. As a result, it becomes handy to carry.

On the other hand, if the diameter of the magnetic disk 5 is less than 1 inch, it is difficult to realize a large recording capacity (e.g., 200 MB or larger, particularly 500 MB or larger). In addition, if the size of the magnetic disk cartridge 4 is reduced to correspond to the magnetic disk 5 smaller than 1 inch, it is fairly difficult to insert the magnetic disk cartridge 4 into the disk drive 6 and to manage the magnetic disk cartridge 4. Therefore, if the size of the magnetic disk 5 is reduced to about 1 inch so that it can be used with the sense of a coin, the magnetic disk cartridge 4 can be made easier to use.

The reason why the diameter of the magnetic disk 5 is 35.5 mm (about 1.4 inches) or less is that when the disk drive 6 is inserted into a slot provided in small electronic equipment such as a digital camera, etc., the size of the disk drive 6 is restricted. The size of the magnetic disk cartridge 4 that can be inserted into the disk insertion slot 7 of the disk drive is a length and width of 25 to 36 mm. Therefore, the diameter of the magnetic disk 5 to be housed in the magnetic disk cartridge 4 is limited to 35.5 mm (about 1.4 inches).

Therefore, the magnetic disk cartridge 4, which houses the magnetic disk 5 having a diameter of 25 to 35.5 mm (about 1 to 1.4 inches), requires a length and width of 25 to 36 mm and a thickness of 1 to 3 mm.

The magnetic disk 5 consists of a material which has a recording capacity of 200 MB or larger. For example, it consists of a high-density magnetic recording medium equipped with a magnetic layer of high recording density including barium ferrite powder. More specifically, the magnetic disk 5 consists of a magnetic recording medium, for example, disclosed in Japanese Patent Application No. 2001-205290. The magnetic recording medium has a non-magnetic layer which includes both non-magnetic powder and a binder, and a magnetic layer which includes both ferromagnetic powder (which is ferromagnetic metal powder or hexagonal-system ferrite powder) and a binder on at least one surface of a nonmagnetic substrate. The non-magnetic layer and the magnetic layer are disposed in the recited order. In the non-magnetic layer, the quantity of carbon black whose average particle diameter is 10 to 30 nm is 10 to 50 weight parts with respect to 100 weight parts of the aforementioned magnetic powder. The thickness of the magnetic layer is 0.2 $\mu$m or less. According to a microanalysis by an electron beam, the standard deviation (b) of the strength of an element with respect to an average strength (a) resulting from ferromagnetic powder is $0.03 \leq b/a \leq 0.4$. The center plane average roughness Ra of the magnetic layer is 5 nm or less, and the 10-point average roughness Rz is 40 nm or less. The magnetic disk 5 employs the above-described material, and information is recorded or reproduced by a magnetic head such as an MR head capable of high recording density.

Thus, the present invention is capable of providing the magnetic disk cartridge 4 whose recording capacity is 200 MB or larger, preferably 500 MB or larger. Therefore, if a still image has 1 MB of data per sheet, the magnetic disk cartridge 4 can store 500 sheets. In the case of a dynamic image, the magnetic disk cartridge 4 can store image contents of about 30 minutes. Thus, the magnetic disk cartridge 4 can store a dynamic image photographed by a digital camera, and a dynamic image transmitted by a portable telephone. As a result, users can conveniently use the magnetic disk cartridge 4.

In the magnetic recording medium of the present invention, if a single disk drive 6 is bought and a plurality of magnetic disk cartridges 4 employing an inexpensive magnetic disk are prepared, a magnetic disk cartridge 4 on which data has been recorded can be stored as it is, or it can be given away to a person. Thus, the magnetic disk cartridge 4 can be used for a variety of content.

When a plurality of disk cartridges 4 are prepared, they are housed in a disk case 2 and are managed and stored. The disk case 2 includes a housing portion 2a, a lid 2b, and a hinge portion 2c. The housing portion 2a is used for housing the magnetic disk cartridge 4 and has a cushion on the inside surface to protect the magnetic disk cartridge 4 from shock. The housing portion 2a may be provided with partition walls so that it can house a plurality of magnetic disk cartridges 4. The lid 2b is connected to the housing portion 2a through the hinge portion 2c so that it can be opened and closed. When the lid 2b is opened, the magnetic cartridge 4 can be removed from the housing portion 2a or housed in the housing portion 2a.

While the present invention has been described with reference to the preferred embodiment thereof, the invention is not to be limited to the details given herein, but may be modified within the scope of the invention hereinafter claimed. For example, in place of the MR head employed in the disk drive 6, a GMR head or a TMR head may be employed. These heads make high-density recording possible. In FIG. 1, the magnetic disk cartridge 4 is approximately rectangular in cross section. However, it may be formed into a disk shape.

What is claimed is:

1. A magnetic recording medium comprising:
   a card-type disk drive which is loaded in a card slot of electronic equipment; and
   a magnetic disk cartridge which is loaded in said disk drive;
   wherein said magnetic disk cartridge rotatably houses a flexible magnetic disk in a housing equipped with a shutter;
   wherein said disk drive has a length of 38 to 55 mm, a width of 3 to 51 mm, and a thickness of 3 to 5 mm, and comprises,
   a drive mechanism for rotating the magnetic disk of said magnetic disk cartridge loaded in said disk drive,
   a magnetic head for magnetically recording or reproducing information on or from said magnetic disk, and
   an electric connection portion for electrically connecting said drive mechanism and said magnetic head with an electronic circuit provided in said electronic equipment;
   wherein said magnetic disk cartridge has a length of 25 to 36 mm, a width of 25 to 36 mm, and a thickness of 1 to 3 mm;
   wherein said magnetic disk comprises a magnetic recording medium of high-recording density employing ferromagnetic powder and has a recording capacity of 200 megabytes or larger;
   wherein the ferromagnetic powder is a metallic ferromagnetic powder;
   wherein the metallic ferromagnetic powder is a hexagonal system ferrite; and
   wherein the hexagonal system ferrite is barium ferrite.

2. A magnetic recording medium as define in claim 1, wherein the magnetic disk is a flexible disk.

3. A magnetic recording medium as defined in claim 2, wherein the magnetic head is an MR head.

4. A magnetic recording medium as defined in claim 2, wherein the magnetic head is a GMR head.

5. A magnetic recording medium as defined in claim 2, wherein the magnetic head is a TMR head.

6. A magnetic recording medium as defined in claim 2, wherein the nonmagnetic layer of the magnetic disk comprises:
   carbon black, whose average particle diameter is 10 to 30 nm is, at a proportion of 10 to 50 weight parts with respect to 100 weight parts of the magnetic powder;
   wherein:
   the thickness of the magnetic layer is 0.2 $\mu$m or less; and
   according to a microanalysis by an electron beam, the standard deviation (b) of the strength of an element with respect to an average strength (a) resulting from ferromagnetic powder is $0.03 \leq b/a \leq 0.4$.

7. A magnetic recording medium as defined in claim 6, wherein the center plane average roughness Ra of the magnetic layer is 5 nm or less, and the point average roughness Rz is 40 nm or less.

8. A magnetic recording medium as defined in claim 7, wherein the recording capacity of the magnetic disk is 500MB or greater.

9. A magnetic recording medium as defined in claim 8, wherein the cartridge is substantially parallelepipedonal in shape.

10. A magnetic recording medium as defined in claim 8, wherein the cartridge is substantially discoid in shape.

* * * * *